United States Patent
Gleason et al.

(10) Patent No.: US 6,361,474 B1
(45) Date of Patent: Mar. 26, 2002

(54) CLOSED-THROTTLE DOWNSHIFT CLUTCH CONTROL FOR AN AUTOMATIC TRANSMISSION

(75) Inventors: Sean E Gleason, Indianapolis; Jeffrey Kurt Runde, Fishers; Phillip F McCauley, Zionsville; Gregory A Hubbard, Carmel, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/569,171

(22) Filed: May 11, 2000

(51) Int. Cl.⁷ .................. F16H 61/04; F16H 61/06; F16H 61/08
(52) U.S. Cl. .................. 477/143; 477/154; 477/155; 192/87.14; 364/424.1; 475/128; 475/127
(58) Field of Search .................. 477/143, 117, 477/120, 124, 144, 148, 156, 169, 176; 192/87.14

(56) References Cited

U.S. PATENT DOCUMENTS

| | | | |
|---|---|---|---|
| 4,070,927 A | | 1/1978 | Polak .................. 74/765 |
| 4,653,351 A | | 3/1987 | Downs et al. .......... 74/866 |
| 4,671,139 A | | 6/1987 | Downs et al. .......... 74/866 |
| 5,014,573 A | * | 5/1991 | Hunter et al. .......... 74/866 |
| 5,046,174 A | | 9/1991 | Lentz et al. .......... 364/424.1 |
| 5,058,460 A | * | 10/1991 | Hibner et al. .......... 74/867 |
| 5,072,390 A | | 12/1991 | Lentz et al. .......... 364/424.1 |
| 5,079,970 A | * | 1/1992 | Butts et al. .......... 74/858 |
| 5,113,343 A | * | 5/1992 | Hunter et al. .......... 364/424.1 |
| 5,211,079 A | | 5/1993 | Runde et al. .......... 74/866 |
| 5,445,576 A | * | 8/1995 | Motamedi et al. .......... 477/105 |
| 5,601,506 A | | 2/1997 | Long et al. .......... 475/120 |
| 5,795,262 A | * | 8/1998 | Robinson .......... 477/92 |

* cited by examiner

Primary Examiner—Sherry Estremsky
Assistant Examiner—Tisha D. Lewis
(74) Attorney, Agent, or Firm—Laura C. Hargitt; Leslie C. Hodges

(57) ABSTRACT

An improved control for an automatic transmission closed-throttle downshift, wherein closed-throttle engine torque is used to raise the transmission input speed to the synchronous speed of the target speed ratio, and wherein the on-coming clutch is controlled in a manner to complete the shift with minimum driveline torque disturbance in spite of clutch control variability. The invention includes a primary on-coming clutch control for completing the downshift when the input speed reaches the synchronous speed, and a contingent on-coming clutch control that is initiated if shift completion is not achieved by the primary control, the contingent control being effective to re-establish input speed synchronization and thereupon engage the on-coming clutch to complete the shift. The primary clutch control involves holding the on-coming clutch in readiness for engagement while the input speed approaches the synchronous speed, and when the synchronous speed is reached, raising the on-coming pressure by a predetermined amount designed to maintain the input speed at the synchronous speed. The contingent clutch control includes a first open loop stage that progressively increases the on-coming clutch pressure to gradually re-establishing the input speed synchronization, and a second closed-loop stage that adjusts on-coming clutch pressure to conform the input speed to a defined trajectory.

8 Claims, 4 Drawing Sheets

CLOSED-THROTTLE DOWNSHIFT CLUTCH CONTROL FOR AN AUTOMATIC TRANSMISSION

TECHNICAL FIELD

This invention relates to closed-throttle downshifting of an automatic transmission, and more particularly to transmission clutch control for synchronizing the transmission input speed with a target speed corresponding to the downshifted speed ratio.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset. Shifting from a currently established speed ratio to new speed ratio involves, in most cases, disengaging a clutch (off-going clutch) associated with the current speed ratio and engaging a clutch (on-coming clutch) associated with the new speed ratio.

The present invention is directed to downshifts, and in particular, to downshifts performed during coast or braking conditions with the engine throttle essentially closed, such shifts being referred to herein as closed-throttle downshifts. Various clutch controls have been proposed for controlling closed-throttle downshifting. For example, the U.S. Patents to Lentz et al. 5,046,174 and Runde et al. 5,211,079 are directed to a control in which the off-going clutch is released, and the transmission input speed is raised to the synchronous speed of the target speed ratio by a closed-loop control of the on-coming clutch based on the deviation of the on-coming clutch slip from a desired slip profile. In another type of control, disclosed in the U.S. Patent to Downs et al. 4,671,139, the off-going clutch is released after the transmission input speed falls below the engine idle speed, and the closed-throttle engine torque raises the input speed to the synchronous speed of the target speed ratio, whereupon the on-coming clutch is engaged.

While the control disclosed by Downs et al. has the potential of achieving high quality closed-throttle downshifts with no negative output torque disturbance, clutch control variability makes it difficult to consistently achieve the desired timing for on-coming clutch engagement. This is particularly the case for shifts occurring at very low vehicle speeds, such as the shift to the first or lowest speed ratio. Accordingly, what is needed is a control that produces consistent high quality closed-throttle downshifts in spite of such variability.

SUMMARY OF THE INVENTION

The present invention is directed to an improved control for an automatic transmission closed-throttle downshift, wherein closed-throttle engine torque is used to raise the transmission input speed to the synchronous speed of the target speed ratio, and wherein the on-coming clutch is controlled in a manner to complete the shift with minimum driveline torque disturbance in spite of clutch control variability. The invention includes a primary on-coming clutch control for completing the downshift when the input speed reaches the synchronous speed, and a contingent on-coming clutch control that is initiated if shift completion is not achieved by the primary control, the contingent control being effective to re-establish input speed synchronization and thereupon engage the on-coming clutch to complete the shift. The primary clutch control involves holding the on-coming clutch in readiness for engagement while the input speed approaches the synchronous speed, and when the synchronous speed is reached, raising the on-coming pressure by a predetermined amount designed to maintain the input speed at the synchronous speed. The contingent clutch control includes a first open loop stage that progressively increases the on-coming clutch pressure to gradually re-establish the input speed synchronization, and a second closed-loop stage that adjusts on-coming clutch pressure to conform the input speed to a defined trajectory. Together, the primary and contingent controls ensure minimum disturbance shift completion in spite of clutch control variability.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
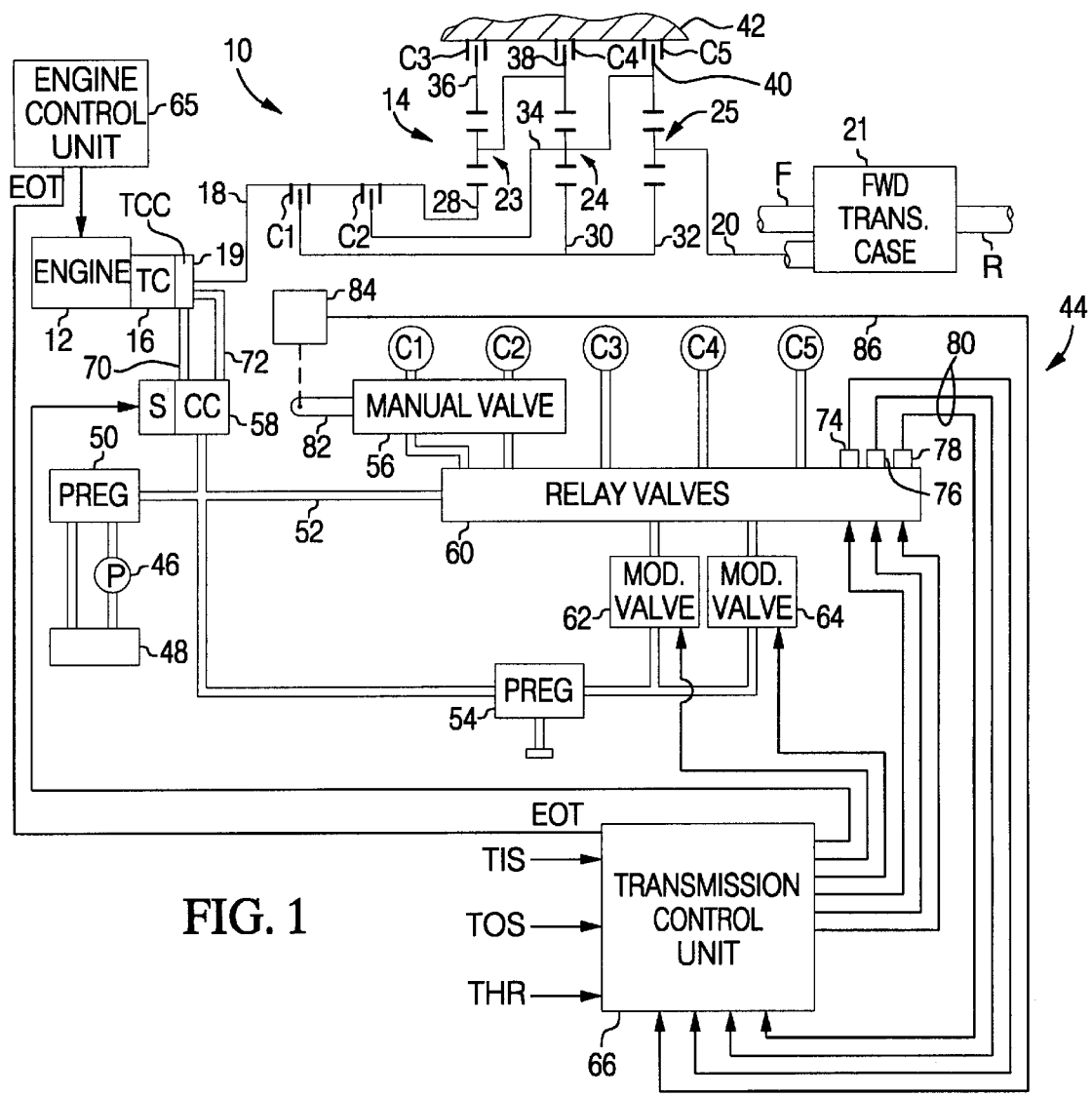
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the second forward speed ratio is established when clutches C1 and C4 are engaged. Shifting from one speed forward speed ratio to another is generally achieved by disengaging one clutch (referred to as the off-going clutch) while engaging another clutch (referred to as the on-coming clutch). For example the transmission 14 is downshifted from second to first by disengaging clutch C4 while engaging clutch C5.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, an engine throttle setting THR, and transmission output speed TOS. Sensors for developing such signals may be conventional in nature, and have been omitted for simplicity. Additionally, the engine control unit 65 supplies an engine output torque signal EOT to transmission control unit 66.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for engaging and/or disengaging the respective clutches C1–C5, develops corresponding force motor current commands, and then supplies current to the respective force motors in accordance with the current commands.

The present invention is directed to an improved control strategy for closed-throttle downshifts, and in particular, to a control strategy for the on-coming clutch which ensures shift completion with minimum driveline torque disturbance in spite of clutch control variations. As in the aforementioned U.S. Patent to Downs et al. 4,671,139, the control of this invention releases the off-going clutch when the input speed TIS is less than the engine speed ES, and utilizes the closed-throttle engine torque to raise TIS to the synchronous speed (SYNC) of the target speed ratio. However, the present invention ensures that the shift will be completed with minimum driveline torque disturbance in spite of clutch control variability with the combination of primary and contingent on-coming clutch controls. The primary control involves holding the on-coming clutch in readiness for engagement, and when TIS reaches SYNC, raising the on-coming pressure by a predetermined amount ($\Delta P$) designed to produce sufficient on-coming clutch torque capacity to maintain the input speed synchronization. If the primary control cannot maintain the input speed synchronization (due to clutch parameter variability, for example), the contingent control is initiated to re-establish input speed synchronization. The contingent clutch control includes a first open-loop stage that progressively increases the on-coming clutch pressure to gradually re-establishing the input speed synchronization, and a second closed-loop stage that adjusts on-coming clutch pressure to conform TIS to a defined trajectory. In any event, the on-coming clutch is fully engaged to complete the shift when input speed synchronization is established. Together, the primary and contingent controls ensure minimum disturbance shift completion in spite of clutch control variability.

Figure 3:
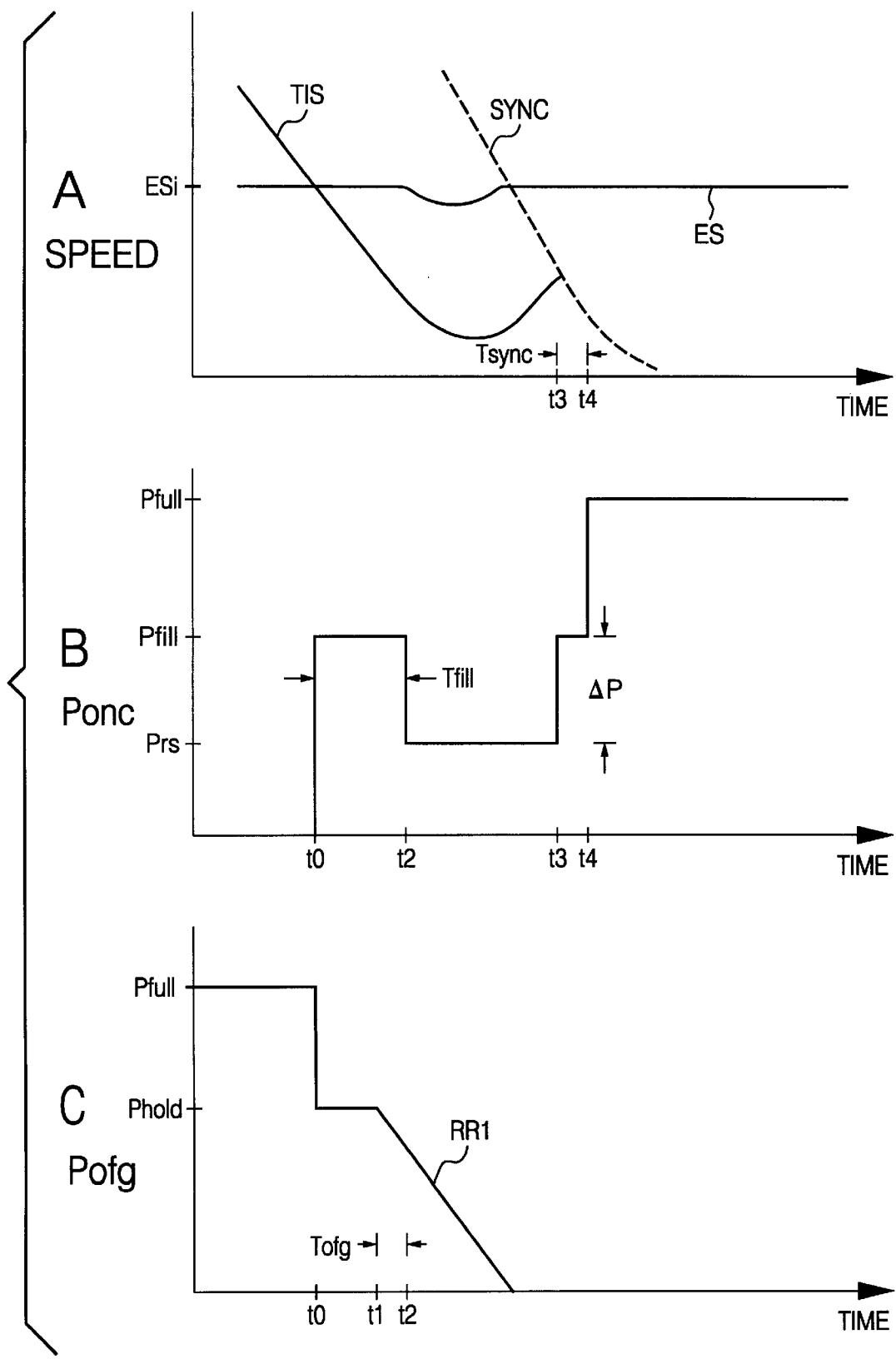
FIG. 3, Graphs A, B and C, graphically depict a closed-throttle downshift according to this invention, using only the primary control.

FIG. 3 graphically depicts a second-to-first closed-throttle downshift carried out according to this invention, using only the primary control. Referring to FIG. 3, Graph A depicts both engine speed ES and transmission input speed TIS, Graph B depicts the commanded on-going clutch pressure Ponc, and Graph C depicts the commanded off-coming clutch pressure Pofg. The downshift is initiated at time t0 when the vehicle has slowed to the point that the speed TIS of input shaft 18 is approaching the engine speed ES, which is shown as having a substantially constant idle value ESi. Shift initiation involves increasing Ponc to a relatively high value designated in Graph B as Pfill, and reducing Pofg to a hold pressure Phold sufficient to maintain engagement of the off-going clutch. The pressure command Ponc is maintained at Pfill for a determined fill interval Tfill (t0–t2) to ready the on-coming clutch for engagement, after which Ponc is reduced to a pre-defined return spring pressure Prs designed to maintain the on-coming clutch in readiness for engagement. Various control methods may be used to adaptively determine the fill interval Tfill; see, for example the U.S Pat. No. 5,072,390 to Lentz et al., issued on Dec. 10, 1991, and incorporated herein by reference, and also the co-pending U.S. patent application Ser. No. 09/566,773 filed on May 9, 2000, both of which are assigned to the assignee of the present invention. As the on-coming clutch fills in preparation for engagement, the input speed TIS continues to fall as shown in Graph A. At time t1 (defined as a predetermined time Tofg prior to the end of the on-coming clutch fill interval Tfill), Pofg is released at a pre-defined ramp rate RR1, as shown in Graph C. This slows the rate of decrease of TIS, and allows the closed-throttle torque of engine 10 (acting through torque converter 16) to pull TIS upward toward the engine idle speed ESi. The control unit 66 monitors TIS relative to the synchronization speed (SYNC) of the target or downshifted speed ratio (indicated by the broken trace in Graph A), and when TIS reaches SYNC at time t3, Ponc is increased from Prs by a pre-defined step increase $\Delta P$, as shown in Graph B. The step increase $\Delta P$ is designed to produce sufficient on-coming clutch torque capacity to maintain TIS in coincidence with SYNC, given the expected level of closed-throttle torque and the torque converter characteristics, assuming that the on-coming clutch is in fact filled. In the example of FIG. 3, the step increase $\Delta P$ is sufficient to maintain input speed synchronization, and when the synchronization has been maintained for a synchronization interval Tsync at time t4, Ponc is increased to full pressure Pfull to complete the downshift.

Figure 4:
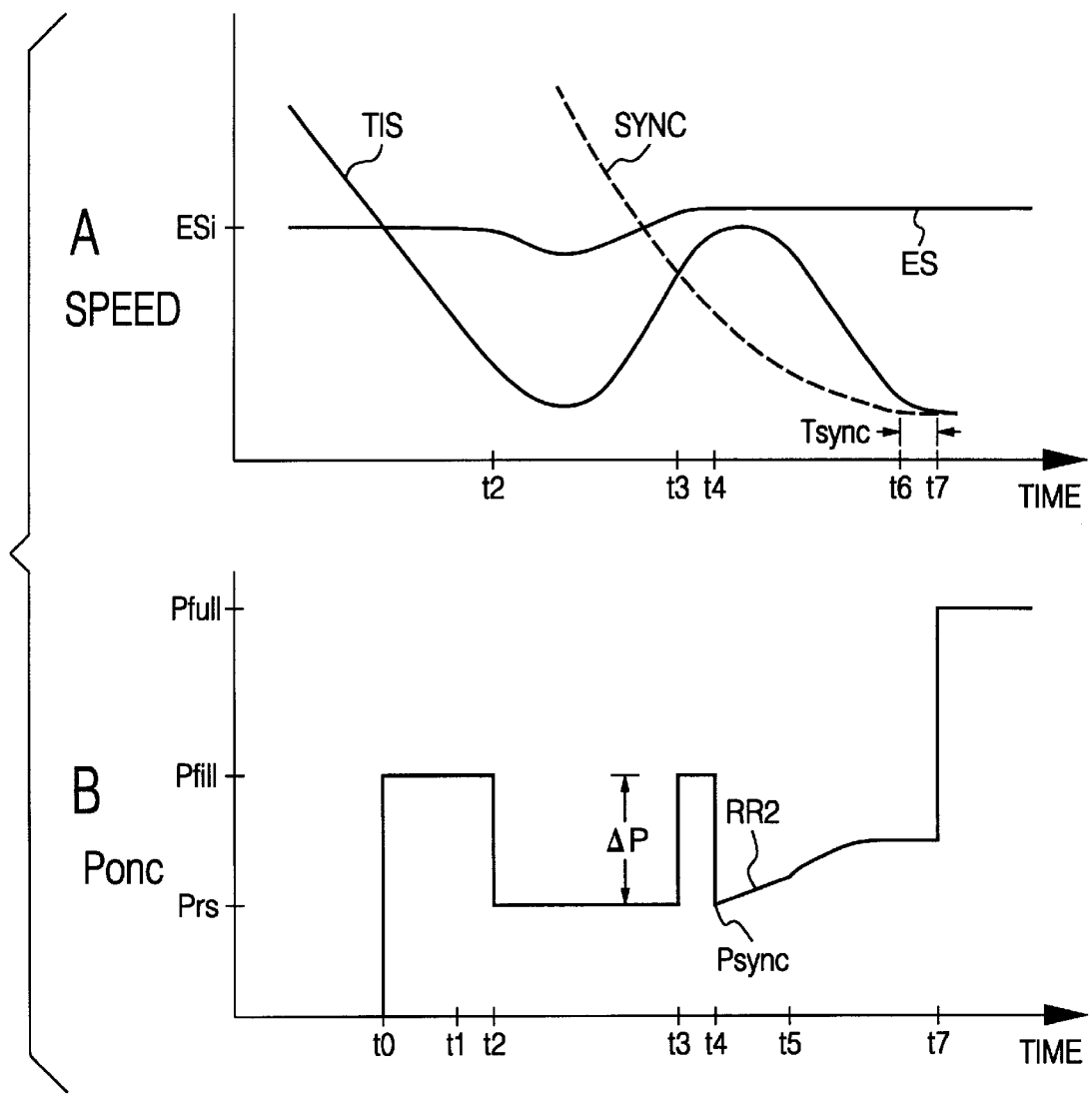
FIG. 4, Graphs A and B, graphically depict a closed-throttle downshift according to this invention, using both primary and contingent controls.

FIG. 4, Graphs A–B, illustrates a condition for which the Ponc step increase $\Delta P$ is not sufficient to maintain the input speed synchronization. Typically, this condition is due to variations in one or more of the following parameters: on-coming clutch fill time or pressure, closed-throttle engine torque, on-coming clutch pressure Prs, and off-going clutch pressure Phold. As in FIG. 3, Graph A depicts both engine speed ES and transmission input speed TIS, and Graph B depicts the commanded on-coming clutch pressure Ponc. When the speed difference (TIS–SYNC)—which mathematically represents the on-coming clutch slippage—exceeds a lower slip threshold THRlower at time t4, the control unit 66 initiates the contingent on-coming clutch control and defers the shift completion step until the input speed synchronization is re-established. Referring to Graph B, the first stage of the contingent control involves immediately lowering Ponc to a computed level Psync, and then increasing Ponc at a determined open-loop ramp rate RR2. The pressure Psync is an on-coming clutch pressure that corresponds to a clutch torque TQcl for producing a desired negative input acceleration $TIS_{13}$ DOT(des), given the transmission input torque TQin. In a preferred embodiment, TQcl is computed based on the dynamic model equation:

$$TQcl=(K1*TIS\_DOT(des))+(K2*TQin) \quad (1)$$

where K1 and K2 are constants. The desired input acceleration TIS_DOT(des) may be a single value, or alternatively, may be dynamically determined based on variations in engine output torque EOT as set forth in the aforementioned copending U.S. patent application Ser. No. 09/528,609. The clutch torque TQcl may be converted to the corresponding pressure Psync using a look-up table of clutch pressure vs. clutch torque for the particular on-coming clutch.

If the first stage of the contingent control produces sufficient on-coming clutch torque capacity to re-establish input speed synchronization, Ponc may be raised to Pfull to complete the shift as soon as synchronization is re-established. However, if the difference (TIS–SYNC) exceeds an upper slip threshold THRupper, the control unit 66 initiates a second stage in which the open-loop ramp rate RR2 is suspended, and a closed-loop pressure adjustment Ponc_CL is added to Ponc. In the example of FIG. 4, this occurs at time t5, and produces sufficient on-coming clutch torque capacity to re-establish input synchronization at time t6. The closed-loop adjustment Ponc_CL is determined by computing an expected input speed TISexp corresponding to the desired input acceleration TIS_DOT(des), delayed to account for the combined electrical and hydraulic delays in producing the commanded on-coming pressure Ponc, and computing a speed error ERR based on the difference between TIS and TISexp.

For example, Ponc_CL may be computed according to the equation:

$$Ponc\_CL=(ERR)*Kp+INT(ERR)*Ki \quad (2)$$

where Kp and Ki are proportional and integral gains, respectively. Once the input synchronization has been maintained for the interval Tsync, Ponc is increased to Pfull to complete the downshift.

Figure 5:
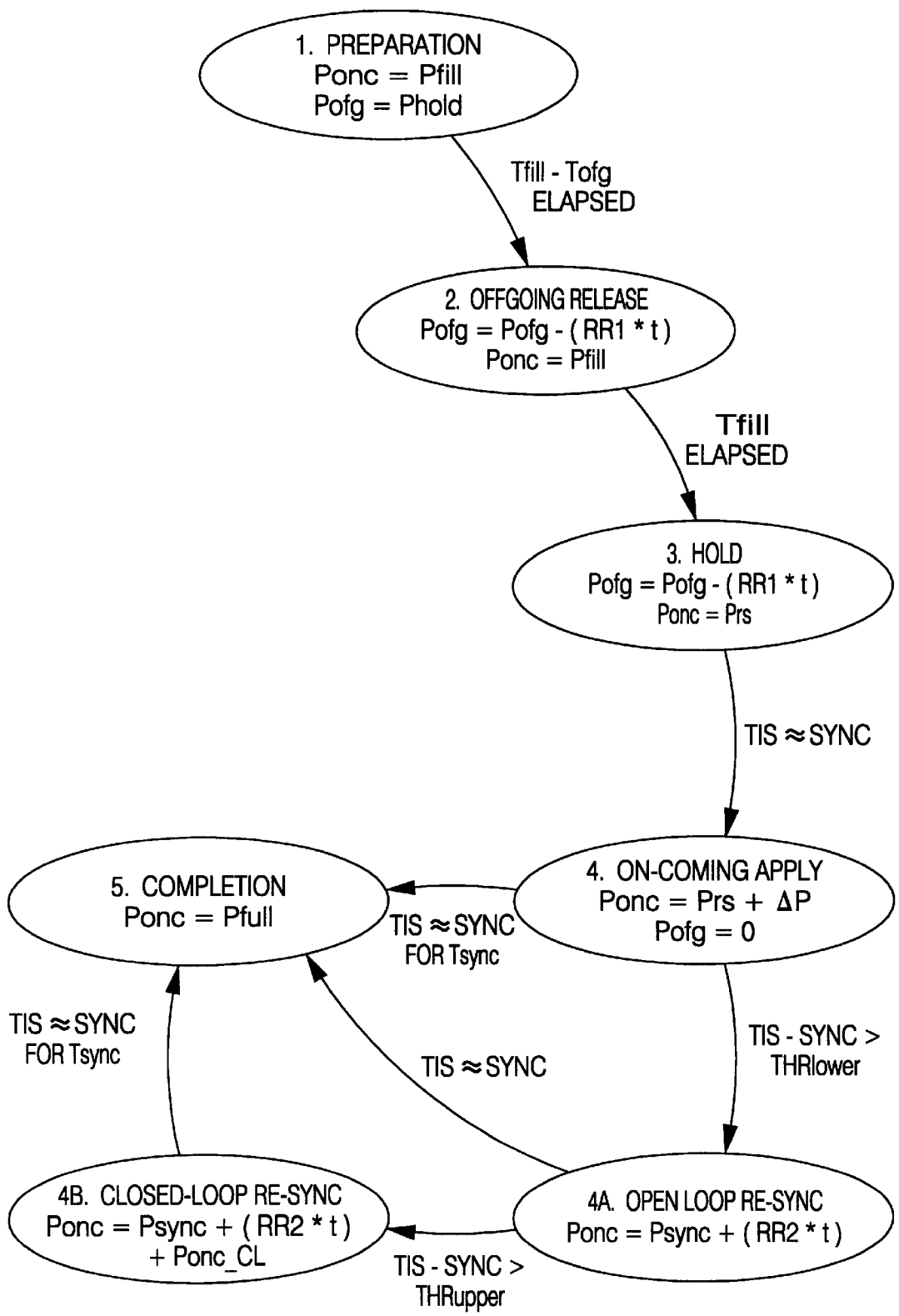
FIG. 5 is a state diagram illustrating the closed-throttle downshift control of this invention.

FIG. 5 is a state diagram summarizing the above-described on-coming clutch control. The primary on-coming clutch control is characterized as comprising four successively executed states (PREPARATION, OFF-GOING RELEASE, HOLD, and ON-COMING APPLY) followed by a COMPLETION state. In the PREPARATION state, Ponc is set equal to the fill pressure Pfill, and Pofg is set equal to Phold. When the elapsed time reaches (Tfill–Tofg), the control transitions to the OFF-GOING RELEASE state, and Pofg is released at the open-loop ramp rate RR1. When the elapsed time reaches (Tfill), the control transitions to the HOLD state, and Ponc is set equal to Prs. When TIS substantially reaches SYNC, the control transitions to the ON-COMING APPLY state; at such point, Ponc is adjusted upward by the step increase $\Delta P$, and Pofg is set to zero. If the input speed synchronization is maintained for the interval Tsync, the control transitions to the COMPLETION state in which Ponc is set equal to Pfull, completing the downshift.

The contingent on-coming clutch control is characterized as comprising the states 4A and 4B, respectively designated as OPEN LOOP RE-SYNC and CLOSED-LOOP RE-SYNC. The control transitions from ON-COMING CLUTCH APPLY to OPEN-LOOP RE-SYNC if the primary clutch control is unable to maintain input synchronization and the difference (TIS–SYNC) exceeds THRlower. In such case, Ponc is determined according to the sum (Psync+RR2 * t), where t is the accumulated time in state 4A and Psync is the pressure corresponding to the clutch torque TQcl computed according to equation (1). If the on-coming pressure provided by state 4A is sufficient to re-establish input speed synchronization, the control transitions to COMPLETION (state 5) when TIS substantially reaches SYNC. Otherwise, the control transitions to CLOSED-LOOP RE-SYNC when the difference (TIS–SYNC) exceeds THRupper. In such case, Ponc is determined according to the sum [Psync+(RR2 * t)+Ponc_CL], where t is the accumulated time in state 4A, and Ponc_CL is the closed-loop adjustment computed according to equation (2). When TIS is substantially equal to SYNC for the synchronization interval Tsync, the control transitions to COMPLETION to complete the downshift.

In summary, the control of this invention carries out a downshift using closed-throttle engine torque, with the on-coming clutch being controlled in a manner to complete the shift with minimum driveline torque disturbance in spite of transmission and clutch control variability. When synchronization is first achieved, the primary on-coming clutch control is designed to maintain the input speed in coincidence with the synchronous speed; but a contingent on-coming clutch control is initiated to re-establish input speed synchronization if shift completion is not achieved by the primary control. While described in reference to the illustrated embodiment, it will be understood that various modifications in addition to those mentioned above will occur to those skilled in the art. For example, various conventional criteria, such as pre-defined time-out periods, may be utilized to trigger certain state transitions. Accordingly, it will be understood that controls incorporating these and other modifications may fall within the scope of this invention, which is defined by the appended claims.

We claim:

1. An on-coming clutch control method for downshifting a vehicle automatic transmission to a target speed ratio, the transmission having an input shaft coupled to receive closed-throttle output torque from an internal combustion engine during a period of vehicle deceleration, and an off-going clutch that is released when the input shaft is below an idle speed of the engine, allowing the closed-throttle output torque to raise the input speed to a synchronous speed of the target speed ratio, comprising:

a primary on-coming clutch control including the steps of: (1) filling the on-coming clutch in preparation for engagement, (2) supplying a hold pressure to the on-coming clutch to maintain it in readiness for engagement, and (3) when the input speed reaches the synchronous speed, raising the pressure supplied to the on-coming clutch by a predetermined amount designed to maintain the input speed in coincidence with the synchronous speed;

detecting an inability of the primary on-coming clutch control to maintain the input speed in coincidence with the synchronous speed, and in response to such detection, initiating a contingent on-coming clutch control to re-establish coincidence between the input speed and the synchronous speed; and engaging the on-coming clutch to complete the shift.

2. The method of claim 1, wherein the step of detecting an inability of the primary on-coming clutch control to maintain the input speed in coincidence with the synchronous speed includes the steps of:

computing a slip speed of the on-coming clutch according to a difference between the input speed and the synchronous speed; and detecting an inability of the primary on-coming clutch control to maintain the input speed in coincidence with the synchronous speed when the computed slip speed exceeds a pre-defined threshold.

3. The method of claim 1, wherein the contingent clutch control includes a first stage in which an open-loop synchronization pressure is supplied to the on-coming clutch for achieving a desired trajectory of the input speed to re-establish coincidence between the input speed and the synchronous speed.

4. The method of claim 3, wherein the first stage of the contingent clutch control includes the step of:

increasing the pressure supplied to the on-coming clutch at a pre-defined ramp rate.

5. The method of claim 1, wherein the contingent clutch control includes a first stage initiated in response to the detected inability of the primary control to maintain coincidence of the input speed with the synchronous speed, and a second stage initiated in response to a detected inability of the first stage to re-establish coincidence between the input speed and the synchronous speed.

6. The method of claim 5, wherein the step of detecting an inability of the first stage to re-establish coincidence between the input speed and the synchronous speed includes the steps of:

computing a slip speed of the on-coming clutch according to a difference between the input speed and the synchronous speed; and detecting an inability of the first stage to re-establish coincidence between the input speed and the synchronous speed when the computed slip speed exceeds a pre-defined threshold.

7. The method of claim 5, wherein:

the first stage of the contingent clutch control supplies an open-loop synchronization pressure to the on-coming clutch for achieving a desired trajectory of the input speed to re-establish coincidence between the input speed and the synchronous speed; and the second stage of the contingent clutch control adjusts the pressure supplied to the on-coming clutch based on a deviation of the input speed from a desired speed corresponding to said desired trajectory to re-establish coincidence between the input speed and the synchronous speed.

8. The method of claim 5, including the steps of:

computing a slip speed of the on-coming clutch according to a difference between the input speed and the synchronous speed;

detecting an inability of the primary on-coming clutch control to maintain the input speed in coincidence with the synchronous speed when the computed slip speed exceeds a first pre-defined threshold; and detecting an inability of the first stage of the contingent on-coming clutch control to re-establish coincidence between the input speed and the synchronous speed when the computed slip speed exceeds a second pre-defined threshold which is higher than the first pre-defined threshold.

* * * * *